Nov. 10, 1970     HIROYUKI TOMA ET AL     3,538,574
METHOD OF MAKING PUSH ROD
Filed June 20, 1967
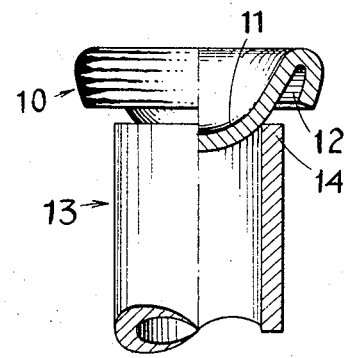
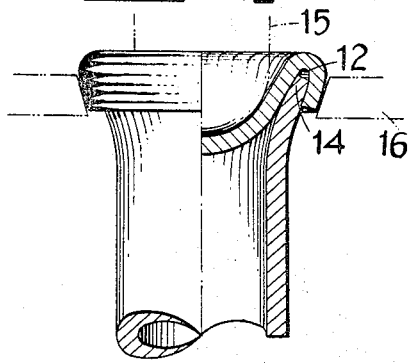
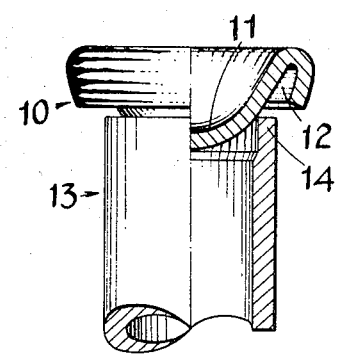
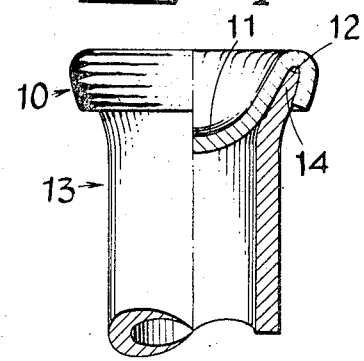
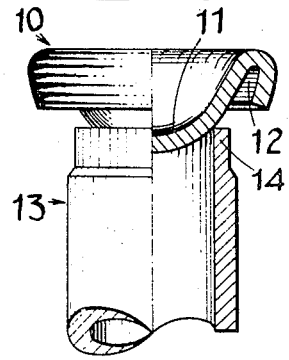
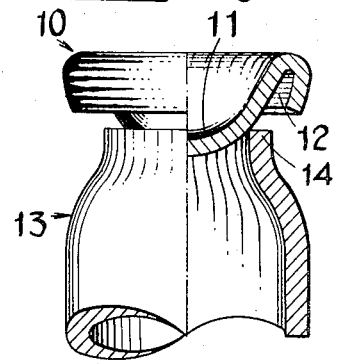
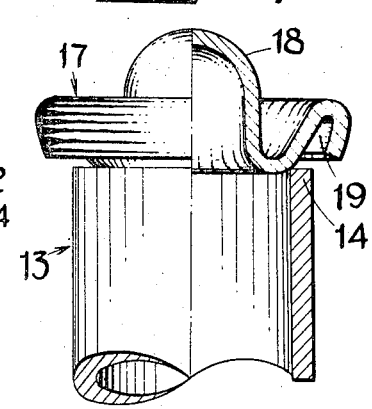
INVENTORS:
Hiroyuki Toma &
Matsuju Nishiyama
BY    *Jacobi & Davidson*
ATTORNEYS

United States Patent Office 3,538,574
Patented Nov. 10, 1970

3,538,574
METHOD OF MAKING PUSH ROD
Hiroyuki Toma, Yokohama, and Matsuju Nishiyama,
Fujisawa, Japan, assignors to Kokan Kako Kabushiki-
Kaisha, Yokohama, Japan, a corporation of Japan
Filed June 20, 1967, Ser. No. 647,502
Int. Cl. B23p *13/00*
U.S. Cl. 29—156.4                              1 Claim

ABSTRACT OF THE DISCLOSURE

A method of making a push rod by plastic working. A metal piece which functions as an end of push rod and has an annular peripheral groove, is placed on an end of a metal hollow tube of which diameter is smaller than the diameter of the annular groove. By applying pressure upon the metal piece and tube toward each other, the end wall of metal tube is deformed outwardly and is molded into the annular groove of metal piece, thus the metal piece and tube are integrally joined together.

---

Push rods are conventionally manufactured by welding or soldering pieces of metal to the ends of metal tube or rod. It is known to manufacture push rods by forging or monobloc machine-cutting. The ends of push rod must have smooth surface and sufficient strength to abrasion as a joint element through which the push rod engages with other moving mechanical parts, while the stem of push rod is not necessarily requested to have such high abrasion resistance and smooth surface but is only requested to have a sufficient strength to withstand to buckling load when it is used. The push rod is usually hardened at its opposite end portions, but the hardening of the end portions often produces a harmful effect on the stem such as producing distortion or increasing brittleness of the stem. It is apparent that the manufacturing of push rod by welding, forging or cutting requires special machines and tools and skilled labors.

This invention has for its object to provide a simple method of making a push rod by connecting integrally a metal tubular structure to a metal piece which functions the working end of push rod.

In accordance with the present invention, the push rod is manufactured by first providing a metal tube having necessary strength and size as the stem of push rod, and a piece of metal is separately prepared to have necessary contour, hardness and smooth surface as the working end of push rod. The metal piece has an annular peripheral groove of which diameter is slightly larger than the diameter of the tube end. The section of the groove is inclined outwardly from the mouth to the bottom of the groove. The width of the groove is smaller than the wall thickness of the tube end.

Then two members, the metal tube and metal piece are carried by suitable devices for arranging the center of metal piece aligned with the axis of tube and for facing the tube end to the annular groove of metal piece. A longitudinal pressure is applied toward the tube and piece each other so as to cause molding of the tube end into the annular groove of metal piece. Thus the interconnection of two members can be performed by one motion of pressing.

In the drawings:

FIG. 1 is a fragmentary side elevation, partly in section, showing a piece of metal and a metal tube about to be interconnected by the method of the invention;

FIG. 2 is an elevation, partly in section, showing the metal piece and the metal tube duly interconnected by plastic deformation of the end wall of the tube;

FIG. 3 is a view similar to FIG. 1, but showing a modified form of metal tube;

FIG. 4 is a view similar to FIG. 2, but showing the product of FIG. 3;

FIGS. 5 and 6 show further modified two forms of metal tube; and

FIG. 7 show another modification of the invention.

Similar reference characters indicate corresponding parts throughout the several views of the drawings.

In accordance with the principles of the present invention and as can be generally from the figures thereof, there is provided the piece of dished, metal disk generally designated 10 which has a centrally concaved spherical surface 11. This spherical surface 11 functions to serve as the socket member of ball-and-socket joint.

The peripheral edge of disk 10 is folded back toward the bottom of the dished disk, so that an annular groove 12 is formed along the periphery of disk 10. As illustrated, the groove 12 is inclined outwardly from the mouth to the bottom of groove 12. The dished and grooved disk 10 is hardened and polished its spherical surface 11. Designated generally 13 is a hollow metal tube which functions as the stem of push rod. The metal tube 13 has a diameter smaller than the diameter of groove 12, and the wall thickness of tube 13 is larger than the width of groove 12. The tube 13 is made of material which is deformable by plastic working. The length of tube 13 is determined suitable to the required size as push rod. The tube 13 must not buckle when it is used as a push rod.

Referring now to FIG. 1, the dished disk 10 is placed on an end 14 of tube 13 with the annular groove 12 faced to the tube end 14. It should be noted that the center of disk 10 is aligned with the axis of tube 13.

The disk 10 and tube 13 are held in the position shown in FIG. 1 by means of suitable carrier devices. Then suitable tool, such as a hydraulic ram or a screw or cam actuated press can be used to apply a pressure upon the disk 10 directed toward the axis of tube 13 or a longitudinal pressure upon the other end of tube 13 directed toward the disk 10. By applying this pressure, the end wall 14 of tube 13 begins to flare along the round bottom surface of dished disk 10 and the pressure will force the metal of tube 13 into the groove 12.

The tool is designed to protect and keep the dished disk 10 in its originally shaped form and is so proportioned that pressure performance is carried to the point where the groove 12 is substantially filled with the metal of tube 13 to give a good interfitting or locking engagement between them as shown in FIG. 2. As illustrated in FIG. 2 in dotted lines, the press for the dished disk 10 is preferably provided with a head 15 which has the same spherical surface as the curvature of surface 11. Undesirable deformation of the groove 12 can be prevented by the provision of a die member 16. The member 16 can be used as a guide for alignment of disk 10 with tube 13, too.

When the disk 10 and tube 13 have been united as described and illustrated in FIG. 2, the tube 13 becomes in effect a permanent, integral part of the dished disk 10, and their interconnection will be substantially equal to that of welding or soldering.

FIG. 3 shows the dished and grooved disk 10 are positioned for interconnection with a slightly modified tube. The tube 13 of FIG. 3 is reduced its wall thickness at the end 14 which is to be interconnected with the disk 10, by grinding the bore of tube 13 at the upper end thereof. By reducing the wall thickness of tube end 14, it is obvious that the lesser pressure can force the metal of tube 13 into the annular groove 12 of disk 10, comparing with the pressing of FIG. 1, and that larger contact surface is obtained between the interconnected disk and tube. FIG. 4 illustrates the product of FIG. 3.

It is observed that the workability and strength of push rod may be improved by the modification of FIG. 2. When the push rod of FIG. 4 is used actually, the tendency to expand the stem at the interconnection of disk 10 and tube 13 is considerably reduced in comparison with the push rod of FIG. 2.

The expanding tendency which exists in the push rod of FIG. 2, is not a desirable thing, however, it will not deny the reliability of product of the invention.

With the same conception as described above, the tube 13 of FIG. 5 is reduced its wall thickness by grinding the outer surface of tube end 14. The tube end 14 may also be treated to reduce the diameter of tube end in itself, as shown in FIG. 6.

The shape of end of the push rod which is produced by the present invention, is not limited to a special contour. FIG. 7 shows an example of modification of push rod end. The metal piece 17 of FIG. 7 has a centrally convexed surface 18 through which the push rod engages with another moving mechanical part for transmission of power. The metal piece 17 has an annular groove 19 at the periphery thereof similar to the groove 12 of FIGS. 1 to 6.

What we claim is:

1. A method of making a push rod from a metal disc and a tubular metal rod comprising the steps of: shaping the metal disc to form a cap member having a spherical wall section and an annular groove at the periphery thereof, the side wall of said annular groove being tapered inwardly from the bottom to the mouth of the groove; hardening the cap member and forming a smooth contact surface on the exterior of said spherical wall section; providing the tubular metal rod with a diameter slightly smaller than the diameter of said annular groove at the mouth thereof and with the tube wall thickness slightly larger than the width of said annular groove; positioning the open end of said metal rod onto the tapered inner side wall of said annular groove; applying pressure through said tubular rod to said cap member with the pressure being applied to said rod in its axial direction for axially compressing and radially expanding the open end of said tubular rod into intimate binding contact with the interior of said annular groove.

References Cited

UNITED STATES PATENTS 2,434,080   1/1948   Rosa _____ 29—156.4

JOHN E. CAMPBELL, Primary Examiner

R. J. CRAIG, Assistant Examiner

U.S. Cl. X.R.

29—156.5; 74—579